(12) United States Patent
Bech et al.

(10) Patent No.: US 12,083,907 B2
(45) Date of Patent: Sep. 10, 2024

(54) CONNECTOR FOR ELECTRIC VEHICLE SUPPLY EQUIPMENT

(71) Applicant: ABB E-Mobility B.V, Delft (NL)

(72) Inventors: Lars Peter Bech, Schiedam (NL); Gertjan Koolen, Eindhoven (NL); Stefan Raaijmakers, Delft (NL); Wiebe Zoon, Delft (NL); Jim Van der Heijden, Eindhoven (NL); Miguel Rodriguez Escude, Delft (NL)

(73) Assignee: ABB E-mobility B.V., Delft (NL)

( * ) Notice: Subject to any disclaimer, the term of this patent is extended or adjusted under 35 U.S.C. 154(b) by 449 days.

(21) Appl. No.: 17/412,285

(22) Filed: Aug. 26, 2021

(65) Prior Publication Data

US 2021/0387537 A1    Dec. 16, 2021

Related U.S. Application Data

(63) Continuation of application No. PCT/IB2019/051623, filed on Feb. 28, 2019.

(51) Int. Cl.
*H01R 13/66* (2006.01)
*B60L 3/04* (2006.01)
(Continued)

(52) U.S. Cl.
CPC .......... *B60L 53/16* (2019.02); *H01R 13/6683* (2013.01); *H01R 13/7172* (2013.01); *H01R 2201/26* (2013.01)

(58) Field of Classification Search
CPC ....... B60L 53/16; B60L 3/04; H01R 13/6683; H01R 13/7172; H01R 2201/26;
(Continued)

(56) References Cited

U.S. PATENT DOCUMENTS 6,525,914 B1    2/2003 Legatti
8,215,963 B2 *  7/2012 Ichikawa ................ B60L 50/61
                                                        439/490
(Continued)

FOREIGN PATENT DOCUMENTS

CN    1259752 A    7/2000
CN    101938108 A    1/2011
(Continued)

OTHER PUBLICATIONS

L. Kumpulainen et al, "Mitigation of arc-flash hazards and reduction of costs by selective arc-flash protection," 2008 China International Conference on Electricity Distribution, Dec. 2008, pp. 1-7, IEEE, Guangzhou, China.

(Continued)

*Primary Examiner* — Nghia M Doan
(74) *Attorney, Agent, or Firm* — Leydig, Voit & Mayer, Ltd.

(57) ABSTRACT

A connector for electric vehicle supply equipment includes: a housing that includes one or more electrical coupling members that are connectable between the electric vehicle supply equipment and a mating inlet of an electric vehicle to supply electric power to the vehicle. The housing includes a sensor for detecting light within the housing and outputting a signal in response to a detection of light within the housing to interrupt or disable the supply of electric power to the vehicle through the connector.

21 Claims, 4 Drawing Sheets

(51) Int. Cl.
  *B60L 53/16* (2019.01)
  *H01R 13/717* (2006.01)
(58) Field of Classification Search
  CPC ........ H02H 1/0023; H02H 5/10; Y02T 10/70;
              Y02T 10/7072; Y02T 90/14
  See application file for complete search history.

(56) References Cited

U.S. PATENT DOCUMENTS

| | | | |
|---|---|---|---|
| 9,407,101 B2 * | 8/2016 | Oku | ................ H02J 7/04 |
| 2010/0328057 A1 | 12/2010 | Liu | |
| 2012/0091824 A1 | 4/2012 | Campolo et al. | |
| 2013/0321024 A1 | 12/2013 | Muller et al. | |
| 2014/0063661 A1 | 3/2014 | D'Aversa et al. | |
| 2022/0144109 A1 * | 5/2022 | Garcia-Ferre | ......... H02J 7/0042 |

FOREIGN PATENT DOCUMENTS

| | | | | |
|---|---|---|---|---|
| CN | 102687357 A | 9/2012 | | |
| CN | 103568847 A | 2/2014 | | |
| CN | 207780170 U | 8/2018 | | |
| DE | 102014217851 A1 * | 3/2016 | ............. | B60L 11/18 |
| EP | 0126270 A1 | 11/1984 | | |
| EP | 0429158 A2 | 5/1991 | | |
| EP | 2942850 A1 | 11/2015 | | |
| EP | 4037105 A1 * | 8/2022 | ........... | G02B 6/0001 |
| WO | WO8808217 | * | 10/1988 | |
| WO | WO 8808217 A1 | 10/1988 | | |

OTHER PUBLICATIONS

Choo, K. L. et al., "Design of Arc Fault Detection Circuit in Low Voltage Switchboard," Journal of Industrial Engineering and Management Science, Nov. 2016, pp. 1-16, River Publisher, Denmark.

* cited by examiner

CONNECTOR FOR ELECTRIC VEHICLE SUPPLY EQUIPMENT

CROSS-REFERENCE TO PRIOR APPLICATION

This application is a continuation of International Patent Application No. PCT/IB2019/051623, filed on Feb. 28, 2019, the entire disclosure of which is hereby incorporated by reference herein.

FIELD

The present disclosure relates to supply equipment for electric vehicles, and in particular to a connector for electric vehicle supply equipment.

BACKGROUND

The energy transfer between electric vehicles and electric vehicle supply equipment (EVSE) requires various safety measures to be employed to protect the equipment and the users of the equipment. Therefore there is a substantial need for the devices, apparatuses, methods, systems and techniques disclosed herein.

SUMMARY

In an embodiment, the present invention provides a connector for electric vehicle supply equipment, comprising: a housing that includes one or more electrical coupling members that are connectable between the electric vehicle supply equipment and a mating inlet of an electric vehicle to supply electric power to the vehicle, the housing including a sensor configured to detect light within the housing and output a signal in response to a detection of light within the housing to interrupt or disable the supply of electric power to the vehicle through the connector.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
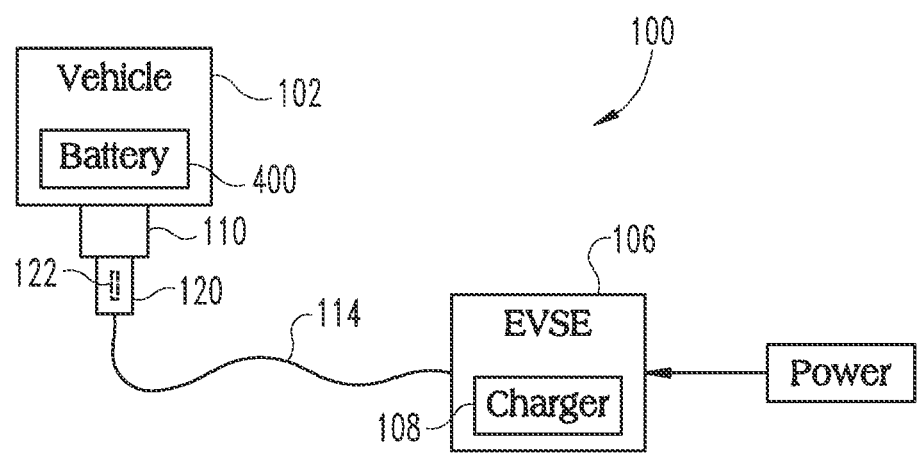
FIG. 1 is a schematic of an example electric vehicle charging system.

In an embodiment, the present invention provides devices, apparatuses, methods, systems and techniques for protecting EVSE from electrical arcing and/or defects within one or more components of the EVSE, such as in a connector that mates with the inlet of the electric vehicle. Further embodiments, forms, objects, features, advantages, aspects and benefits of the disclosure shall become apparent from the following description and drawings.

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The present disclosure relates to devices, apparatuses, methods, systems, and techniques for charging an electric vehicle with electrical power from a power grid or other source that is delivered by electric vehicle supply equipment through a connector. For example, a system 100 is shown in FIG. 1 which includes an electric vehicle 102 that includes a rechargeable energy storage device, such as a battery 104 or other suitable energy storage device, for example. In the illustrative embodiment, the electric vehicle 102 is embodied as, or otherwise includes, any vehicle powered partially or completely by electrical power, such as a vehicle driven by an electric motor, drive unit, or propulsion system, for example. In another example, the illustrative electric vehicle 102 may be embodied as, or otherwise include, a hybrid electric vehicle that includes a non-electrically powered drive unit (e.g., an internal combustion engine) in addition to one or more electrically-powered motors, drive units, or propulsion systems.

System 100 includes EVSE 106 that receives power from the power grid or other electrical power source. EVSE 106 includes a charger 108 for converting AC power to DC power, or for charging with AC power. In other embodiments, charger 108 is provided on vehicle 102. Vehicle 102 includes an inlet 110 that mates with a connector 120 that plugs into inlet 110 to provide electrical power for charging battery 104 from EVSE 106. Connector 120 can be coupled with EVSE 106 with a cord 114 or other suitable connection arrangement. As discussed further below, connector 120 includes a sensor 122 that is operable to sense light within the connector 120 to interrupt or disable the electrical power supply in response to the detection of light.

EVSE 106 may also be referred to as supply equipment, a vehicle charger, charging equipment, a charging station, a charger, etc. and be presented in any one of a number of configurations. EVSE 106 could be a wall mounted charger in a garage or building where vehicles are parked, on a pedestal or kiosk at an outdoor location or curbside location, with a portable charging device, or other locations.

Figure 2:
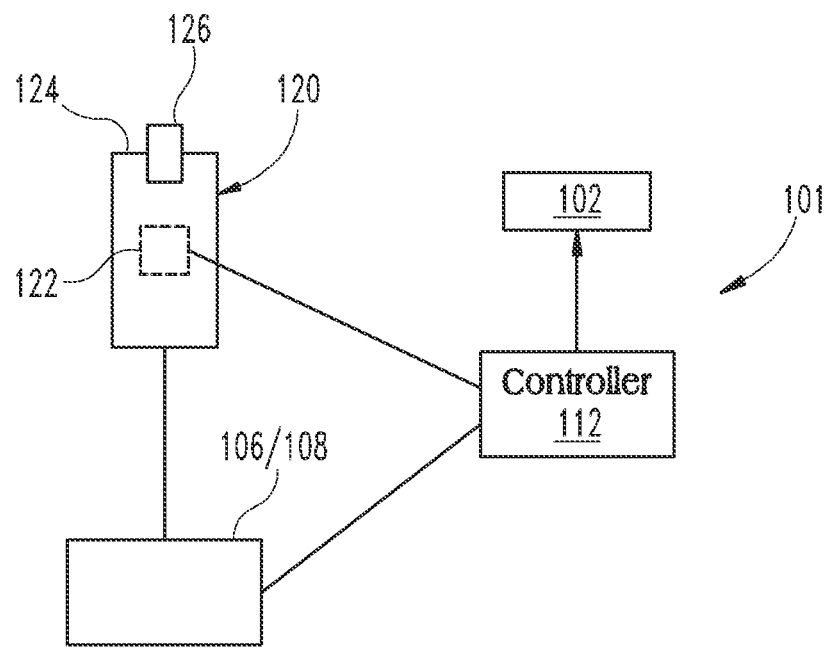
FIG. 2 is a schematic of an example controller arrangement for the electric vehicle charging system of FIG. 1.

In FIG. 2 a communication system 101 is shown in which a controller 112 is in communication with components of the system 100, including connector 120, vehicle 102, and/or EVSE 106/charger 108. Controller 112 can be part of EVSE 106, charger 108, connector 120, and/or vehicle 102. Furthermore, it should be appreciated that the controller 112 may be embodied as, or otherwise include, a collection of devices incorporated into the EVSE 106, the charger 108, the connector 120, and/or the vehicle 102. For ease of illustration, however, the controller 112 is depicted separately from the EVSE 106, the charger 108, the connector 120, and the vehicle 102 in FIG. 2.

The connector 120 includes sensor 122 that is located within a housing 124 of connector 120. In an embodiment, the material of housing 124 completely surrounds and encompasses the sensor 122. Housing 124 includes one or more electrical coupling members 126 that are removably engageable to the inlet 110 to electrically couple EVSE 106 to battery 104 to provide power to recharge battery 104.

In an embodiment, sensor 122 is a light sensor that is located within housing 124 and operable to detect light within housing 124. Under normal conditions, there is no light present in housing 124 for detection by sensor 122, or there is less than a threshold amount of light present within housing 124 for detection by sensor 122. However, an electrical arc within the connector 120, or a crack or defect in the housing 124, creates light within housing 124, or a path for light to travel into housing 124, that can be detected by sensor 122. Sensor 122 can output a signal in response to the detection of light to controller 112, which can interrupt the electrical power supply if the battery 104 is being charged to prevent destructive energy dissipation inside the housing 124. After interrupting the supply of electrical power during charging of battery 104, or upon detection of light during a non-charging condition of battery 104, controller 112 can also disable the supply of electrical power to connector 120 so that it cannot be used for charging until connector 120 is serviced or replaced. In an embodiment, sensor 122 is a photo diode type sensor that can detect a difference between an open circuit and a dark environment in case the sensor is rendered inoperable due to the occurrence of a short circuit. In another embodiment, sensor 122 can include a micro-camera with a high frame rate capable of arc detection.

Figure 3:
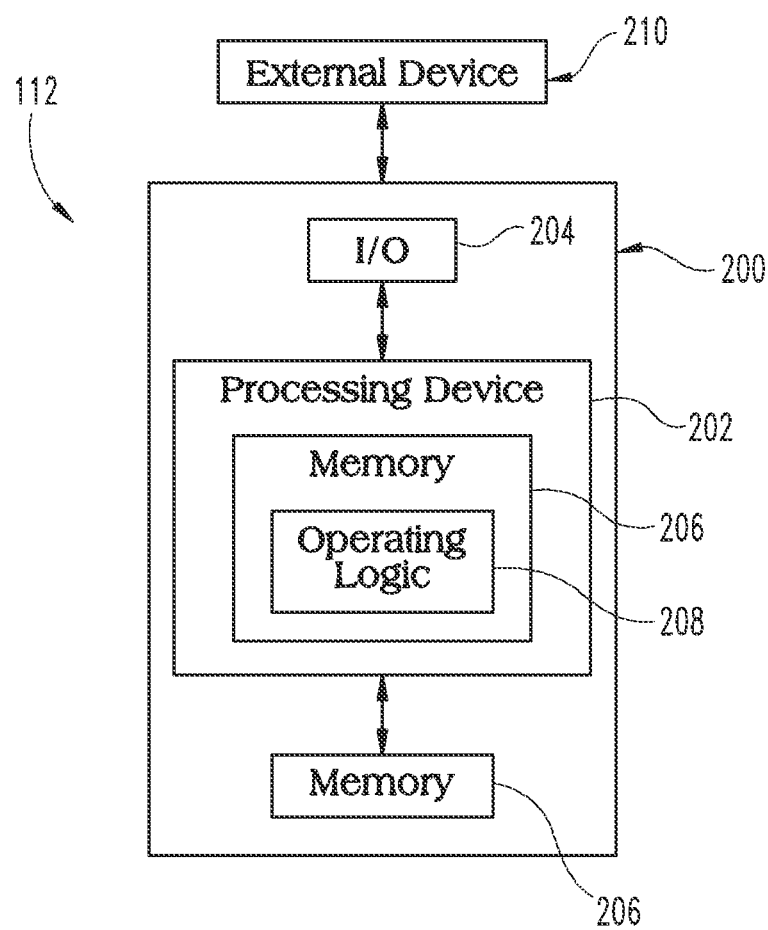
FIG. 3 is a schematic of an example controller apparatus for use with the electric vehicle charging system of FIG. 1.

In FIG. 3 there is a schematic block diagram of an exemplary controller apparatus 200 such as may be provided as controller 112 of system 100 in FIG. 2. Controller 200 may include a processor 202, an input/output device 204, memory 206, and operating logic 208. Furthermore, the controller 200 communicates with one or more other controllers 200 of an external device 210 such as charger 108, vehicle 102, and/or sensor 122. Controller 200 may be a stand-alone device, an embedded system, or a plurality of devices structured to perform the functions described with respect to system 100.

The processor 202 may be embodied as, or otherwise include, any type of processor, controller, or other compute circuit capable of performing various tasks such as computer functions and/or controlling the functions of the system 100. For example, the processor 202 may be embodied as a single or multi-core processor(s), a microcontroller, or other processor or processing/controlling circuit. In some embodiments, the processor 202 may be embodied as, include, or be coupled to an FPGA, an application specific integrated circuit (ASIC), reconfigurable hardware or hardware circuitry, or other specialized hardware to facilitate performance of the functions described herein. Additionally, in some embodiments, the processor 202 may be embodied as, or otherwise include, a high-power processor, an accelerator co-processor, or a storage controller. In some embodiments still, the processor 202 may include more than one processor, controller, or compute circuit.

In the illustrative embodiment, the processor 202 may include memory 206. The memory 206 may be embodied as any type of volatile (e.g., dynamic random access memory (DRAM), etc.) or non-volatile memory capable of storing data (e.g., operating logic 208 defined by programming instructions such as software or firmware or by hardwired logic or other hardware) therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory 206 may be embodied as a block addressable memory, such as those based on NAND or NOR technologies. The memory 206 may also include future generation nonvolatile devices, such as a three dimensional crosspoint memory device, or other byte addressable write-in-place nonvolatile memory devices. In some embodiments, the memory 206 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint may comprise a transistor-less stackable cross point architecture in which memory cells sit at the intersection of word lines and bit lines and are individually addressable and in which bit storage is based on a change in bulk resistance. Memory 206, in some embodiments, may be internal to (e.g., incorporated into) the processor 202 and/or the memory 206 may be external to the processor 202.

The illustrative input/output device 204 is configured to enable the controller 200 to communicate with other local controllers (e.g., control devices included in the EVSE 106/charger 108, and/or the vehicle 102) or a central controller. The input/output device 204 may include a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. The input/output device 204 may include more than one of these adapters, credentials, or ports, such as a first port for receiving data and a second port for transmitting data, for example.

As described below with reference to FIG. 6, the memory 206 may have instructions stored therein that are executable by the processor 202 to cause the processor 202 to evaluate a light detection within the connector 120. Based on that evaluation, the instructions stored in the memory 206 may be executable by the processor 202 to cause the processor 202 to interrupt or disable the supply of electrical power to the vehicle 102 from the EVSE 106 through the connector 120 to resist electrical arcing or short circuiting.

Figure 4:
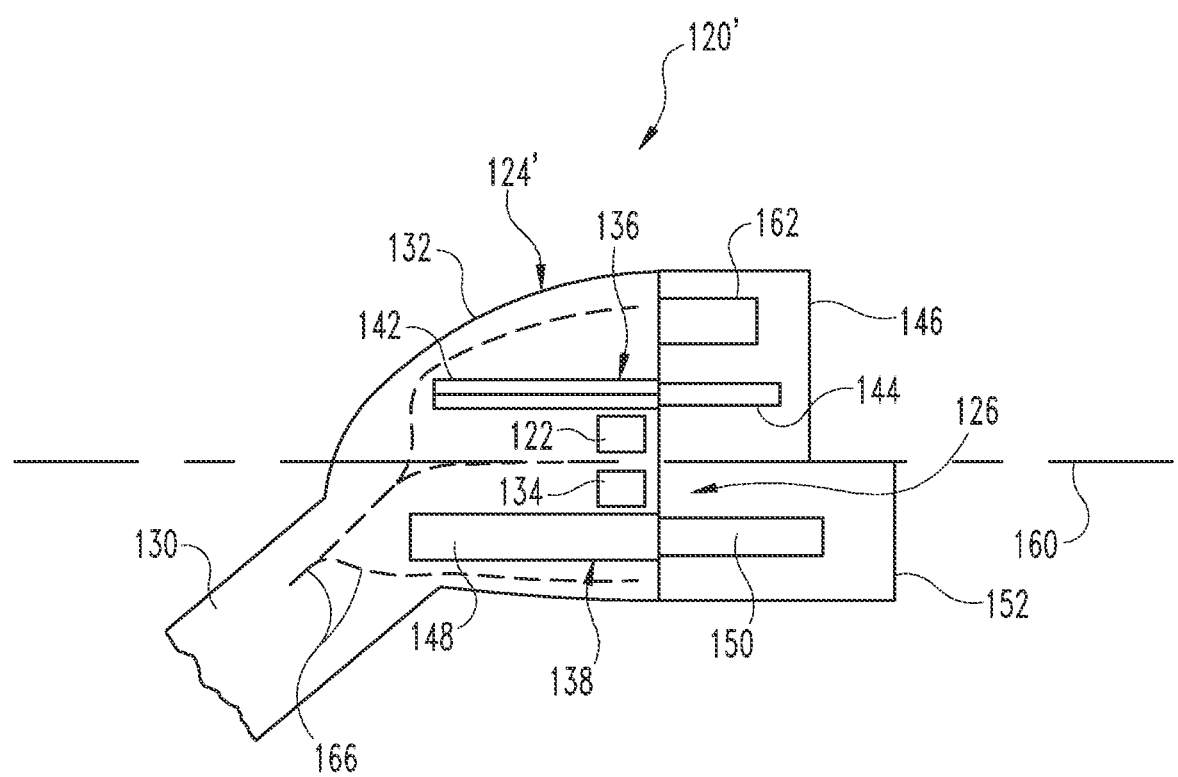
FIG. 4 is a schematic of an example connector for the electric vehicle charging system of FIG. 1.

In an embodiment of connector 120' shown in FIG. 4, a side view of a housing 124' is depicted transparently for ease of description. Housing 124' includes a coupling portion 130 for coupling with cord 114. Housing 124' also includes a bulbous or otherwise suitably sized and shaped body portion 132 that encapsulates electrical coupling members 126 and sensor 122 therein. Connector 120' also includes a test light 134 located within housing 124' at a location in which light from the test light 134 is detectable by sensor 122.

Figure 5:
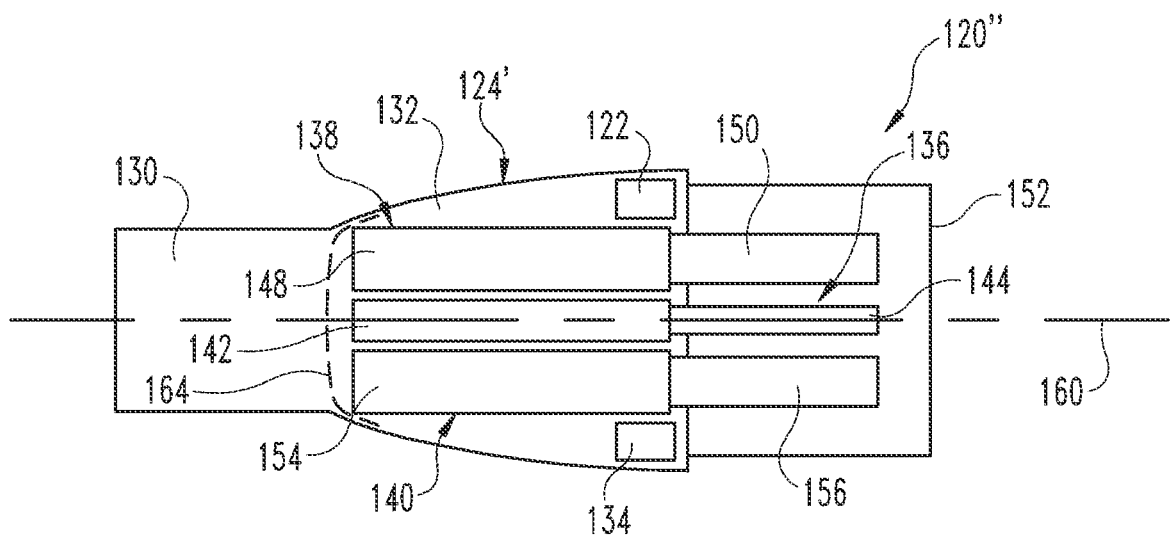
FIG. 5 is a schematic of another example connector for the electric vehicle charging system of FIG. 1.

Electrical coupling members 126 can include a protective earth coupling member 136, a first DC electrode 138, and a second DC electrode 140 (FIG. 5). One of the DC electrodes can be a positive electrode, and the other DC electrode can be a negative electrode. A protective earth/functional ground (PE/GND) coupling member 136 includes an insulated part 142 embedded in housing 124' and a PE/GND copper pin part 144 projecting into a first shrouded opening 146 of connector 120'. First DC electrode 138 includes an insulated part 148 embedded in housing 124' and a first copper pin part 150 projecting into a second shrouded opening 152 that is adjacent to first shrouded opening 146. As shown in FIG. 5, first DC electrode 140 includes an insulated part 154 embedded in housing 124' and a first copper pin part 156 projecting into second shrouded opening 152. Other embodiments contemplate other types and/or arrangements for the electrical coupling members, including AC coupling members.

In FIG. 4 sensor 122 and test light 134 are located between PE/GND coupling member 136 and DC electrodes 138, 140 at or adjacent to the center axis 160 of housing 124'. In FIG. 5, another embodiment connector 120" includes sensor 122 and test light 134 located adjacent the perimeter of housing 124' on opposite sides of center axis 160. Other embodiments contemplate other locations for sensor 122 and/or test light 134 so long as sensor 122 can detect light within the housing 124'. In addition connector 120', 120" can include one or more connections or pins 162 that project into first shrouded opening 146 for signaling between the EVSE 106 and the electric vehicle 102 and for connection with the mating inlet 110.

The sensor 122 is integrated in the EVSE connector 120, 120', 120" that connects to the electric vehicle 102, to monitor if there is light, such as from an electrical arc or outside light, inside the housing 124, 124'. The sensor 122 could be configured to detect ultra-violet (UV) light, visible light, infra-red (IR) light, and combinations of these. The sensor 122 can be installed inside the connector 120, 120', 120" with direct line of sight to the electrical coupling members 126. As shown in FIG. 5, reflective material 164, like aluminium (good reflector of UV, visible and IR light), or a light transmitting fiber or fibers 166 as shown in FIG. 4, could also be included to redirect or transmit the possible light to or toward the sensor 122. If reflective material 164 such as aluminum is used, it should not block incoming light, and break with the connection housing 124, 124' to allow for light to enter the housing if the housing is cracked or broken. In addition, the reflective material 164 should not compromise the insulation between the internal conductors of the connection 120, 120', 120".

If there is an arc between electrical coupling members 126 or any other connections, or an infiltration of light due to a crack or defect in the housing, the sensor 122 can send a signal to the controller 112. The signal can be sent by independent wiring, and/or use basic signal wiring such as control or proximity pilots. The controller 112 or other emergency system can interrupt the power supply to the connector 120, 120' 120" in response to this signal to prevent destructive energy dissipation inside the connector 120, 120', 120". In an embodiment, the sensor 122 may open one of the pilots which is then detected by EVSE 106 to execute the emergency shutdown. The system 100 can also provide periodic checks of the operability of sensor 122 by operation of test light 134. The sensor 122 can send a signal to the controller 112 upon detection of the test light indicating the sensor is operable, or can disable operation of the charging system if light is not detected upon operation of test light 34 due to the sensor 122 potentially being defective.

Sensor 122 can also detect cracks or other failures of the housing 124, 124' by detecting light from within the housing 124, 124' during non-charging periods. This would indicate a failure in the internal integrity of the connector 120, 120', 120" such that it may not be protected against water, dust, animals, insects, or other external conditions. Potting can also be used in all or a part of the body portion 132 of housing 124, 124' to eliminate moisture, increase insulation, and protect against direct contact with the electrical coupling members 126. In an embodiment, the potting is transparent and the housing 124, 124' surrounding the potting is opaque. If the housing 124, 124' is filled with transparent potting, the sensor 122 is still able to detect light from arc flashes or cracks/crevices in the housing 124, 124'. Also, light from an arcing event or test light flash can disperse through the potting, giving the sensor 122 better coverage of the entire interior of the housing 124, 124'. This would reduce or eliminate the possibility of the sensor 122 not detecting the arc/crack if the direct line of sight is blocked by one of the electrical coupling members 126.

Figure 6:
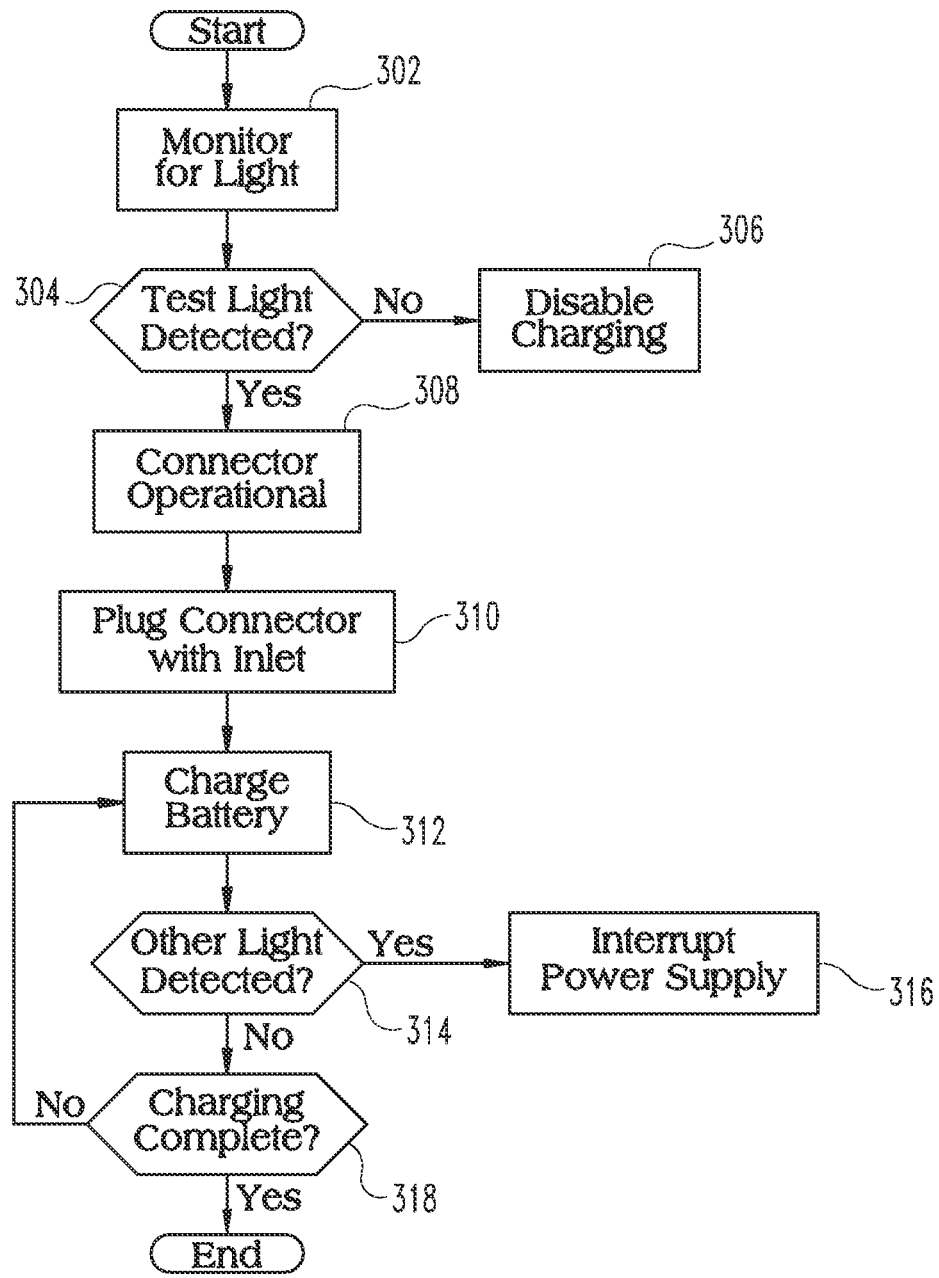
FIG. 6 is a flow diagram of an example procedure for supplying electrical power to an electric vehicle.

A method 300 is shown in FIG. 6 for supplying electrical power to an electric vehicle may be embodied as, or otherwise include, a set of instructions that are executable by the controller 112 (i.e., the processor 202 as indicated above). It should be appreciated, however, that in some embodiments, the illustrative method 300 may be cooperatively performed by the controller 112 and one or more other devices (e.g., control devices included in the EVSE 106/charger 108 and/or the vehicle 102). In such embodiments, performance of the illustrative method 300 may be associated with communication and/or coordination between the controller 112 and the one or more control devices. In any case, the method 300 corresponds to, or is otherwise associated with, performance of the blocks described below in the illustrative sequence of FIG. 6. It should be appreciated, however, that the method 300 may be performed in one or more sequences different from the illustrative sequence.

In addition, it should be appreciated that the blocks described below in the illustrative sequence of FIG. 6 may prompt, direct, or otherwise be associated with one or more actions performed by a user or operator in use of the system 100. For example, the blocks may correspond to, or otherwise be associated with, prompts that may be displayed (e.g., on a display, dashboard, or user interface) to prompt and/or direct user action in use of the system 100. Accordingly, performance of the blocks of the illustrative method 300 may be associated with, or otherwise include, a control component (e.g., one or more actions performed/directed by the controller 112 and the one or more control devices) and/or an operator component (e.g., one or more actions performed by an operator in response to the control component).

Method 300 includes a block 302 to monitor for light detection in housing 124, 124' by sensor 122 of the connector 120, 120', 120". In one embodiment, the monitor for light detection in housing 124, 124' includes flashing the test light 134. If test light is detected and conditional 304 is YES in response to the flash of the test light, then the sensor 122 and its associated connector checks as operational at block 308 and procedure 300 continues at block 310. If no light is detected in response to the flash of the test light and conditional 304 is NO, then procedure 300 continues at block 306 to disable charging of the battery 104 using the connector 120, 120', 120" until the connector is serviced.

In an embodiment, a conditional can also be provided that includes determining if the light is detected due to a crack or defect in the housing 124, 124'. For example, if there is no associated actuation or flash of the test light 134 but light is detected in housing 124, 124', then procedure 300 continues at block 306 to disable charging to prevent use of the connector 120, 120', 120" until it is serviced and checked for connector integrity. In an embodiment, this can also be used for short circuit detection to disable charging operation in response to a short circuit condition that might occur in connector 120, 120', 120" between charging operations. It is contemplated that a threshold light amount can be required to be detected before disabling charging.

Block 310 includes plugging in the connector 120, 120', 120" of the EVSE 106 into mating inlet 110 of the electric vehicle 102. Procedure 300 continues at block 312 to provide electrical power to charge battery 104 through connector 120, 120', 120". Procedure 300 continues at a conditional 314 to continue to check for other light (non-test light) at sensor 122 during charging of the battery 104 due to, for example, arcing between conducting members 126 in the housing 124, 124'. If such light is detected and conditional 314 is YES, then the supply of electrical power is interrupted at block 316 to prevent damage to the connector 120, 120', 120". If light is not detected and conditional 314 is NO, procedure 300 continues at conditional 318 to check if the charging of battery 104 is complete. If conditional 318 is NO, procedure 300 returns to block 308. If conditional 318 is YES, then charging is stopped and procedure 300 ends, or returns to block 302.

In an embodiment, a conditional can also be provided that includes determining if the light is detected due to flashing of test light 134 during the charging block 312. For example, if there is an associated actuation of the test light 134 but no light is detected in housing 124, 124' during charging block 312, then sensor 122 is defective and procedure 300 includes providing an emergency stop to the charging, and disabling charging to prevent use of the connector 120, 120', 120" until it is serviced and/or replaced. In an embodiment, test light pulse duration can be around 20 milliseconds and occur every 3 seconds during the charging operation. Other durations and frequencies for the test pulses are also contemplated.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

Various aspects of the present disclosure are contemplated. For example, in one aspect a connector for EVSE is provided. The connector includes a housing that includes one or more electrical coupling members that are connectable between the EVSE and a mating inlet of an electric vehicle to supply electric power to the vehicle. The housing including a sensor that is operable to detect light within the housing and output a signal in response to the detection of light within the housing to interrupt or disable the supply of electric power to the vehicle through the connector.

In one embodiment, the housing includes a test light operable to produce light within the housing that is detectable by the sensor. In another embodiment, the sensor is operable to detect one or more of ultraviolet light, infrared light, and visible light within the housing. In yet another embodiment, the sensor is encapsulated within the housing. In yet another embodiment, the one or more electrical coupling members includes first and second direct current coupling members and a protective earth coupling member.

In another embodiment, the housing is opaque and includes transparent potting to disperse light within the housing. In yet another embodiment, the housing includes reflective material to direct light within the housing toward the sensor. In still another embodiment, the housing includes one or more optical fibers to transmit light from within the housing toward the sensor. In another embodiment, the sensor is a photo diode.

In another aspect, a system includes EVSE for providing electrical power to an electric vehicle, a controller operable to control a supply of the electrical power to the electric vehicle from the EVSE, and a connector connected to the EVSE and in communication with the controller. The connector includes a housing with one or more electrical coupling members for engagement with a mating inlet of the electric vehicle and a sensor within the housing that is operable to detect light within the housing. In response to the detection of light within the housing by the sensor, the sensor outputs a signal to the controller and the controller interrupts or disables the supply of the electrical power to the vehicle from the EVSE through the connector.

In an embodiment, the connector includes a test light within the housing, and the test light is operable to produce light within the housing that is detectable by the sensor. In a refinement of the embodiment, the controller is configured to, in response to the sensor not detecting light upon operation of the test light, interrupt or disable the supply of the electrical power from the EVSE through the connector.

In another embodiment, the controller is configured to interrupt or disable the supply of electrical power in response to the signal detecting light above a threshold amount of light. In yet another embodiment, the controller is located within a charger of the electric vehicle supply equipment. In another embodiment, the controller is located within the connector.

In another aspect, a method for supplying electrical power to an electric vehicle includes: plugging a connector of an electric vehicle supply equipment into a mating inlet of the electric vehicle; supplying electrical power from the electric vehicle supply equipment to the electric vehicle through the connector; and interrupting the supply of electrical power in response to detecting light within a housing of the connector.

In one embodiment, the method includes flashing a test light within the housing and disabling the supply of electrical power through the connector in response to failing to detect the flash of the test light within the housing. In one refinement of the method, detecting light within the housing includes detecting the light with a sensor embedded in the housing. In a further refinement, the sensor is embedded in the housing adjacent to one or more electrical coupling members of the connector that are supported within the housing. In another refinement, the test light is embedded in the housing.

In another embodiment, the method includes flashing the test light before plugging the connector into the mating inlet and disabling the supply of electrical power through the connector in response to failing to detect the flash of the test light within the housing. In yet another embodiment, the method includes, with the connector unplugged from the mating inlet, disabling the supply of electrical power in response to detecting light within the housing of the connector.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A connector for electric vehicle supply equipment, comprising:
   a housing that includes one or more electrical coupling members that are connectable between the electric vehicle supply equipment and a mating inlet of an electric vehicle to supply electric power to the vehicle, the housing including a sensor that is within the housing and configured to detect light within the housing and output a signal in response to a detection of light within the housing to interrupt or disable the supply of electric power to the vehicle through the connector.

2. The connector of claim 1, wherein the housing includes a test light configured to produce light within the housing that is detectable by the sensor.

3. The connector of claim 1, wherein the sensor is configured to detect one or more of ultraviolet light, infrared light, and visible light within the housing.

4. The connector of claim 1, wherein the one or more electrical coupling members includes first and second direct current coupling members and a protective earth coupling member.

5. The connector of claim 1, wherein the housing is opaque and includes transparent potting configured to disperse light within the housing.

6. The connector of claim 1, where the housing includes reflective material configured to direct light within the housing toward the sensor.

7. The connector of claim 1, wherein the housing includes one or more optical fibers configured to transmit light from within the housing toward the sensor, wherein the sensor comprises a photo diode.

8. A system, comprising:
   electric vehicle supply equipment configured to provide electrical power to an electric vehicle;
   a controller configured to control a supply of the electrical power to the electric vehicle from the electric vehicle supply equipment; and
   a connector connected to the electrical vehicle supply equipment and in communication with the controller,
   wherein the connector includes a housing with one or more electrical coupling members configured to engage with a mating inlet of the electric vehicle and a sensor within the housing that is configured to detect light within the housing, and
   wherein, in response to a detection of light within the housing by the sensor, the sensor is configured to output a signal to the controller such that the controller interrupts or disables the supply of the electrical power to the vehicle from the electric vehicle supply equipment through the connector.

9. The system of claim 8, wherein the connector includes a test light within the housing, the test light being configured to produce light within the housing that is detectable by the sensor.

10. The system of claim 9, wherein the controller is configured to, in response to the sensor not detecting light upon operation of the test light, interrupt or disable the supply of the electrical power from the electric vehicle supply equipment through the connector.

11. The system of claim 8, wherein the controller is configured to interrupt or disable the supply of electrical power in response to the signal indicating detection of light above a threshold amount of light.

12. The system of claim 8, wherein the controller is located within a charger of the electric vehicle supply equipment.

13. The system of claim 8, wherein the controller is located within the connector.

14. A method for supplying electrical power to an electric vehicle, comprising:
- plugging a connector of an electric vehicle supply equipment into a mating inlet of the electric vehicle;
- supplying electrical power from the electric vehicle supply equipment to the electric vehicle through the connector; and
- interrupting a supply of electrical power in response to detecting light within a housing of the connector, wherein detecting the light within the housing comprises detecting the light with a sensor that is within the housing.

15. The method of claim 14, further comprising:
flashing a test light within the housing and disabling the supply of electrical power through the connector in response to failing to detect a flash of the test light within the housing.

16. The method of claim 15, wherein the test light is embedded in the housing.

17. The method of claim 15, further comprising:
flashing the test light before plugging the connector into the mating inlet and disabling the supply of electrical power through the connector in response to failing to detect the flash of the test light within the housing.

18. The method of claim 14, wherein the sensor is embedded in the housing adjacent to one or more electrical coupling members of the connector that are supported within the housing.

19. The method of claim 14, further comprising:
with the connector unplugged from the mating inlet, disabling the supply of electrical power in response to detecting light within the housing of the connector.

20. The method of claim 14, wherein the housing further comprises a plurality of electrical coupling members, and wherein interrupting the supply of electrical power in response to detecting the light within the housing of the connector comprises:
- detecting the light caused by an arc between the plurality of electrical coupling members or caused by a crack or defect in the housing; and
- interrupting the supply of electrical power based on detecting the light caused by the arc between the plurality of electrical coupling members or caused by the crack or defect in the housing.

21. The method of claim 20, wherein the plurality of electrical coupling members comprise a protective earth coupling member, a first direct current (DC) electrode, and a second DC electrode.

* * * * *